(12) United States Patent  
Corbett, Jr.

(10) Patent No.: US 7,158,034 B2  
(45) Date of Patent: Jan. 2, 2007

(54) PIPE GASKET MANUFACTURING AND IDENTIFICATION METHOD WITH RFID TRACKING

(76) Inventor: Bradford G. Corbett, Jr., 1300 E. Berry St., Fort Worth, TX (US) 76119

( * ) Notice: Subject to any disclaimer, the term of this patent is extended or adjusted under 35 U.S.C. 154(b) by 192 days.

(21) Appl. No.: 11/033,210

(22) Filed: Jan. 11, 2005

(65) Prior Publication Data

US 2005/0189408 A1   Sep. 1, 2005

Related U.S. Application Data

(60) Provisional application No. 60/535,928, filed on Jan. 12, 2004.

(51) Int. Cl.  
*G08B 13/14* (2006.01)

(52) U.S. Cl. ............. 340/572.1; 340/572.8; 277/314

(58) Field of Classification Search ........... 340/572.1, 340/572.8, 572.9; 277/314, 608, 609, 625  
See application file for complete search history.

(56) References Cited

U.S. PATENT DOCUMENTS

| | | | | |
|---|---|---|---|---|
| 4,834,398 A | * | 5/1989 | Guzowski et al. | 277/624 |
| 5,213,339 A | * | 5/1993 | Walworth | 277/314 |
| 6,237,966 B1 | * | 5/2001 | Kearns | 285/230 |
| 6,277,315 B1 | * | 8/2001 | H.ang.llstedt et al. | 264/250 |
| 6,550,775 B1 | * | 4/2003 | Knapp | 277/314 |
| 6,666,379 B1 | * | 12/2003 | Lake | 235/491 |
| 7,068,170 B1 | * | 6/2006 | Green | 340/572.1 |

* cited by examiner

*Primary Examiner*—John Tweel, Jr.

(74) *Attorney, Agent, or Firm*—Charles D. Gunter, Jr.

(57) ABSTRACT

An asset tracking system is provided, having particular usefulness in connection with the marking and tracking of sealing gaskets of the type used in water and sewage systems and in fluid conveyance systems generally. Interrogation of RFID tags located on the sealing gaskets insures that the gaskets are properly tracked, identified and sorted.

11 Claims, 1 Drawing Sheet

PIPE GASKET MANUFACTURING AND IDENTIFICATION METHOD WITH RFID TRACKING

CROSS REFERENCE TO RELATED APPLICATIONS

The present U.S. patent application claims priority from earlier filed U.S. Provisional Patent Application: Ser. No. 60/535,928 filed Jan. 12, 2004 "Pipe Gasket Manufacturing and Identification Method with RFID Tracking."

BACKGROUND OF THE INVENTION

1. Field of the Invention

The present invention relates to radio frequency identification (RFID) systems for asset identification, marking and tracking, and to one embodiment of such a system for identifying, marking and tracking sealing gaskets of the type used in water, sewage and other types of fluid conveyance systems.

2. Description of the Prior Art

There exists a need in a number of different industries for improvements in the way that items are identified, marked and tracked. This is especially true where a large number of items must be separated, identified, counted and sorted. One example is the manufacture of sealing gaskets for use in water, sewage and fluid conveyance systems generally. Present day means for solving this problem typically use manual workers who sequentially sort amongst the many items, picking single items manually and identifying the items visually. This solution is unsatisfactory because it is both slow and expensive, due to the high reliance on manual labor, and because mistakes occur in identifying and sorting the items.

Various solutions have been proposed to automate the above process which involve the use of either bar codes or various other types of optical readers. For example, identification schemes which relay upon reading bar codes or other optical indicia are not well suited for use in the sorting of flat goods rather than contoured items. However, in the case of gasket manufacture, the items in question range in size from very small to large and are typically processed in a variety of orientations which are problematical for line of sight reading devices. There are other barriers and obstacles to the accurate machine identification and automated counting and sorting of sealing gaskets of the type under consideration.

For example, sealing gaskets are typically either extruded or compression molded, both being relatively high temperature and pressure operations. Whether the identifying "tag" is molded into the rubber of the gasket or merely afixed in some way to the gasket exterior, it must be robust enough in construction to withstand the influences present in the normal manufacturing environment. The tag must also be provided at an acceptable cost to allow it to be utilized in mass production operations. These type demands have frustrated efforts to adapt bar codes and other optical indicia to sealing gasket technology. The lack of a viable coding and sorting solution for this segment of the fluid conveyance and sealing technologies has resulted in high labor costs, lack of stock control, and reduced profits.

A need thus exists for a marking and tracking technology that has the ease of use and the low cost associated with bar codes, and yet is more robust and tolerant of the conditions found in large scale industrial manufacturing plants for sealing gaskets and other similar environments.

SUMMARY OF THE INVENTION

The present invention has as one object to provide a marking and identification system for sealing gaskets which does not suffer from the line of sight problems associated with bar codes.

Another object of the invention is to provide such a marking an identification system which is relatively inexpensive, both from initial cost and associated maintenance costs, and therefore is economical to implement for even the sealing gasket industry.

Another object is to provide such a system which can be utilized on even items which are being mass-sorted in close proximity to one another, such as on closely-spaced sorting conveyors.

Another object of the invention is to provide such a system which is robust enough to withstand the normal environment of a gasket manufacturing operation.

These and other objects of the invention are accomplished by providing a marking and identification system which includes the steps of providing a RFID of a suitable size and configuration for the particular task at hand; attaching at least one such RFID to the sealing gasket to be marked and identified; and subsequently interrogating the RFID by means of a suitable reader to thereby obtain identifying information about the particular sealing gasket which is so marked.

Preferably, the RFID is a tag which is read by an associated reader. In some instances, the tag contains information which is alterable by the reader. For sealing gasket applications, the RFID is preferably encapsulated in an encapsulating material which renders it impervious to normal environmental influences such as water, petroleum derivitives, greases and lubricants, as well as the effects of temperature and pressure. In one particularly preferred embodiment of the invention, the RFID is encapsulated in a liquid resin which is subsequently cured. In another embodiment of the invention, the electrical components of the RFID are physically isolated from the environment by enclosing the components between top and bottom layers of a heat and shock resistant material.

In one embodiment of the invention, a method of marking and identifying sealing gaskets is shown in which a wireless radio frequency identification device is manufactured by (1) providing a substrate having conductive lines formed thereon, the conductive lines comprising an antenna; (2) conductively bonding an integrated circuit chip and a battery to the conductive lines on the substrate; (3) providing a liquid resin which is compatible with the substrate, integrated circuit chip and battery and applying the liquid resin onto the substrate effective to encapsulate the chip and battery within the liquid resin on the substrate; (4) after the applying, curing the liquid resin mixture into a solid mass which encapsulates the chip and battery and comprises a wireless radio frequency identification device; and (5) attaching the wireless radio frequency device to the sealing gasket. The radio frequency identification device is subsequently interrogated by means of a suitable reader to thereby obtain identifying information about the sealing gasket.

Additional objects, features and advantages will be apparent in the written description which follows.

DETAILED DESCRIPTION OF THE INVENTION

Figure 1:
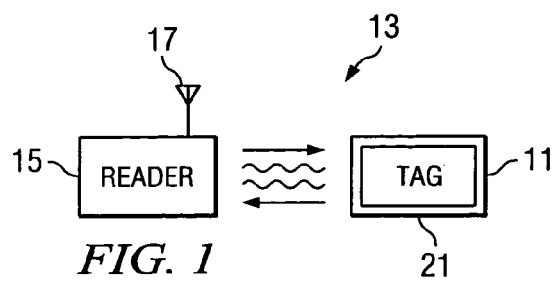
FIG. 1 is a block diagram of a wireless communication system which includes a tag for placement on a sealing gasket and an associated reader.

The system of the invention uses wireless radio frequency identification devices (RFID's) to mark, track and identify sealing gaskets of the type used in fluid conveyance systems such as water and sewer line. RFID technology will first be described in general terms before turning to a specific end application of the invention. Whereas RFID's were, in the past, cost prohibitive, such devices can now be purchased commercially for on the order of 20 to 30 cents apiece, making them suitable for the purposes of the present invention. RFID tags are now well-known and typically include an integrated circuit (IC) that is operatively coupled to an antenna (the tag antenna). The tag may also have a battery, or it may have no battery and may instead obtain energy from an external reader. RFID tags without batteries may be preferred for applications in which lower cost is a dominant factor, and RFID tags with batteries may be preferred for applications in which a longer read range is preferred. Either or both may be used in conjunction with the present invention. The RFID tags of the present invention preferably resonate in the UHF or microwave frequency band, either of which enables an RFID reader to interrogate the tags from a sufficiently long read range to be useful.

The IC associated with an RFID tag typically includes a certain amount of memory in which a tag identifier is stored, and perhaps other information related to the tag, and/or the item or items with which the tag is to be associated. When an RFID reader (also known as an interrogator, either of which may read or write information to an RFID tag) transmits energy via its reader antenna to interrogate the RFID tag, the tag responds with information from which the reader can obtain the RFID tag identifier or other information. The data, identifier, or information obtained by the RFID reader may then be compared to entries in a database of identifiers or to information associated with that RFID tag. In that manner, information regarding an RFID-tagged item may be obtained, updated, and provided to a user, and/or written to an RFID tag, perhaps even in real-time.

Presently available RFID systems operate in both low frequency (less than 100 megahertz) and high frequency (greater than 100 megahertz) modes. Unlike their low-frequency counterparts, high-frequency tags can have their data read at distances of greater than one meter, even while closely spaced together. New data can also be transmitted to the tags.

In the low-frequency system, an integrated circuit sends a signal to an oscillator, which creates an alternating current in the reader's coil. That current, in turn, generates an alternating magnetic field that serves as a power source for the tag. The field interacts with the coil in the tag, which induces a current that causes charge to flow into a capacitor, where it is trapped by the diode. As charge accumulates in the capacitor, the voltage across it also increases and activates the tag's integrated circuit, which then transmits its identifier code. High and low levels of a digital signal, corresponding to the ones and zeros encoding the identifier number, turn a transistor on and off. Variations in the resistance of the circuit, a result of the transistor turning on and off, cause the tag to generate its own varying magnetic field, which interacts with the reader's magnetic field. In this technique, called load modulation, magnetic fluctuations cause changes in current flow from the reader to its coil in the same pattern as the ones and zeros transmitted by the tag. The variations in the current flow in the reader coil are sensed by a device that converts this pattern to a digital signal. The reader's integrated circuit then discerns the tag's identifier code.

In the high-frequency system, an integrated circuit sends a digital signal to a transceiver, which generates a radio-frequency signal that is transmitted by a dipole antenna. The electric field of the propagating signal gives rise to a potential difference across the tag's dipole antenna, which causes current to flow into the capacitor; the resulting charge is trapped by the diode. The voltage across the capacitor turns on the tag's integrated circuit, which sends out its unique identifier code as a series of digital high- and low voltage levers, corresponding to ones and zeros. The signal moves to the transistor. The transistor gets turned on or off by the highs and lows of the digital signal, alternately causing the antenna to reflect back or absorb some of the incident radio frequency energy from the reader. The variations in the amplitude of the reflected signal, in what is called backscatter modulation, correspond to the pattern of the transistor turning on and off. The reader's transceiver detects the reflected signals and converts them to a digital signal that is relayed to the integrated circuit, where the tag's unique identifier is determined.

Referring now to FIG. 1, a preferred embodiment of the marking, tracking and sorting system of the invention will now be described. FIG. 1 shows, in block diagram fashion, a remote intelligent communication device or wireless communication device 11 which comprises part of a communication system 13. The remote intelligent communication device is capable of functions other than the identifying function of a radio frequency identification device. A preferred embodiment of the remote intelligent communication device includes a processor.

The communication system 13 includes an interrogator unit or reader 15. The wireless communication device 11 communicates via wireless electronic signals, such as radio frequency (RF) signals, with the reader 15. Radio frequency signals including microwave signals are utilized for communications in a preferred embodiment of communication system 13. The communication system 13 includes an antenna 17 coupled to the reader 15.

Figure 2:
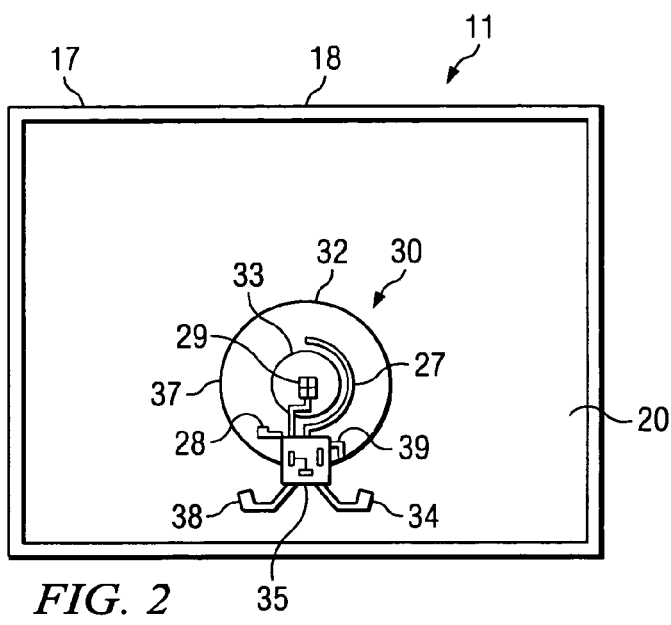
FIG. 2 is a front, partly schematic view of a wireless communication device of the type used in practicing the invention with the cover layer removed for ease of illustration.

Referring to FIG. 2, one form of the wireless communication device 11 which is useful for purposes of the present invention is shown. The device 11 is of the general type shown in issued U.S. Pat. No. 6,666,379, although it will be understood that other commercially available "tags" can be utilized, as well. The device 11 includes an insulative substrate or layer of supportive material 18. Example materials for the substrate 18 comprise polyester, polyethylene or polyimide film having a thickness of 3–10 mils.

Substrate 18 provides a first or lower portion of a housing for the wireless communication device 11 and defines an outer periphery 21 of the device 11. Substrate 18 includes a plurality of peripheral edges 17. A support surface 20 is provided to support components and circuitry formed in later processing steps upon substrate 18. In FIG. 2, support surface 20 comprises an upper surface of the layer shown.

A patterned conductive trace 30 is formed or applied over the substrate 18 and atop the support surface 20. A preferred conductive trace 30 comprises printed thick film (PTF). The printed thick film comprises silver and polyester dissolved into a solvent. One manner of forming or applying the conductive trace 30 is to screen or stencil print the ink on the support surface 20 through conventional screen printing techniques. The printed thick film is preferably heat cured to flash off the solvent and UV cured to react to UV materials present in the printed thick film.

The conductive trace 30 forms desired electrical connections with and between electronic components which will be described below. In one embodiment, substrate 18 forms a portion of a larger roll of polyester film material used to manufacture multiple devices 10. In such an embodiment, the printing of conductive trace 30 can take place simultaneously for a number of the to-be-formed wireless communication devices.

The illustrated conductive trace 30 includes conductive lines and patterns, such as an electrical connection 28, a first connection terminal 29 and a second connection terminal 27. Conductive trace 30 additionally defines transmit and receive antennas 32, 34 in one embodiment of the invention. Antennas 32, 34 are suitable for respectively transmitting and receiving wireless signals or RF energy. Transmit antenna 32 constitutes a loop antenna having outer peripheral edges 37. Receive antenna 34 constitutes two elongated portions individually having horizontal peripheral edges 38.

Other antenna constructions are also possible. For example, both transmit and receive operations can be implemented with a single antenna in alternative embodiments of the present invention. Both antennas 32, 34 preferably extend or lie within the confines of peripheral edges 17 and outer periphery 21 and define a plane.

One embodiment of a wireless communication device 11 includes a power source 33, an integrated circuit chip 35, and capacitor 39. Power source 33, capacitor 39, and integrated circuit chip 35 are provided and mounted on support surface 20 and supported by substrate 18. The depicted power source 33 is disposed within transmit antenna 32 of wireless communication device 11. Capacitor 39 is electrically coupled with loop antenna 32 and integrated circuit 35 in the illustrated embodiment.

Power source 33 provides operational power to the wireless communication device 11 and selected components therein, including integrated circuit 35. In the illustrated embodiment, power source 33 comprises a battery. In particular, power source 33 is preferably a thin profile battery which includes first and second terminals of opposite polarity. More particularly, the battery has a lid or negative (i.e., ground) terminal or electrode, and a can or positive (i.e., power) terminal or electrode.

It is important for purposes of the present invention that the RFID be heat and pressure tolerant. In order to achieve this result, the electronic components are ultimately encapsulated, either chemically or physically, in a protective barrier type material or materials. In the embodiment illustrated in FIGS. 1 and 2, conductive epoxy is applied over desired areas of support surface 20 using conventional printing techniques, such as stencil or screen printing, to assist in component attachment described just below. Alternately, solder or another conductive material is employed instead of conductive epoxy. The power source 33 is provided and mounted on support surface 20 using the conductive epoxy. Integrated circuit 35 and capacitor 39 are also provided and mounted or conductively bonded on the support surface 20 using the conductive epoxy.

Integrated circuit chip 35 includes suitable circuitry for providing wireless communications. For example, in one embodiment, integrated circuit chip 35 includes a processor, memory, and wireless communication circuitry or transponder circuitry for providing wireless communications with reader 15.

One embodiment of transponder circuitry includes a transmitter and a receiver respectively operable to transmit and receive wireless electronic signals. In particular, transponder circuitry is operable to transmit an identification signal responsive to receiving a polling signal from reader 15. Specifically, the processor is configured to process the received polling signal to detect a predefined code within the polling signal. Responsive to the detection of an appropriate polling signal, the processor instructs transponder circuitry to output an identification signal. The identification signal contains an appropriate code to identify the particular device 11 transmitting the identification signal in certain embodiments. The identification and polling signals are respectively transmitted and received via antennas 32, 34 of the device 11.

First and second connection terminals 29, 27 are coupled to the integrated circuit 35 by conductive epoxy in accordance with a preferred embodiment of the invention. The conductive epoxy also electrically connects the first terminal of the power source 33 to the first connection terminal 29.

Subsequently, conductive epoxy is dispensed relative to perimetral edge 37 and electrically connects perimetral edge with connection terminal 27. In the illustrated embodiment, perimetral edge defines the can of the power source 33. The conductive epoxy connects the positive terminal of the power source 33 to connection terminal 27. The conductive epoxy is then cured. Thus, the integrated circuit and battery are conductively bonded relative to the substrate and to the conductive lines of trace.

An encapsulant, such as encapsulating epoxy material, is subsequently formed following component attachment. In one embodiment, the encapsulant is provided over the entire support surface 20. Such encapsulates or envelopes the antennas 32, 34, integrated circuit 35, power source 33, conductive circuitry 30, capacitor 39, and at least a portion of the support surface 20 of substrate 18. The encapsulant operates to insulate and protect the components (i.e., antennas 32, 34, integrated circuit 35, power source 33, conductive circuitry 30 and capacitor 39).

A flowable encapsulant is preferably applied over substrate 18 and subsequently cured following the appropriate covering of the desired components. In the preferred embodiment, such encapsulant constitutes a two-part off the shelf epoxy which typically includes fillers such as silicon and calcium carbonate. The preferred two-part epoxy is sufficient to provide a desired degree of flexible rigidity. Specifically, the preferred epoxy comprises a two-component system having a liquid resin material and a liquid hardener material. The resin typically constitutes three times the volume of the hardener within the liquid mixture from which the two-part system cures. Adequate and complete mixing of the resin/hardener two-component epoxy system occurs prior to dispensing or otherwise providing the liquid encapsulant atop the substrate, chip, and battery. Other encapsulant materials of the insulative layer can also be used in accordance with the present invention. Such encapsulation would preferably occur from fabrication of multiple device patterns formed on a single substrate sheet, and then cutting individual devices 11 from the sheet after encapsulation and cure.

Figure 3:
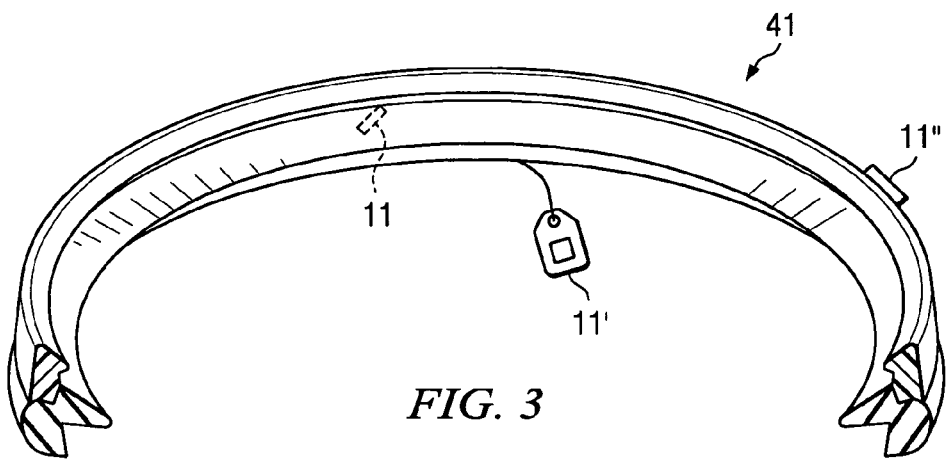
FIG. 3 is a simplified, perspective view of a sealing gasket having a tag of the invention attached thereto.

FIG. 3 shows a completed tag 11 which has been attached to a sealing gasket 41. The tag 11 allows the gasket to be properly tracked, identified and sorted.

In addition to the previously described chemical encapsulation method, it will be understood that the RFID's of the invention can be physically or mechanically isolated from various environmental factors, as well. The RFID's of the invention must be capable of existing in a variety of environments and must therefore be encapsulated or isolated for durability against chemical agents, shock, fluids, dust or dirt, and the like. Although a variety of tags are commercially available which will suffice in most retail and home environments, they must be isolated or protected to withstand the high temperature environment of, for example, a gasket manufacturing operation.

In additional envisioned embodiments of the invention, the electrical components are isolated from the environment by providing the substrate with a top and bottom comprised of substantially flexible, high temperature resistant materials. Preferably, the substrate with its electrical components are housed in a top and bottom layers comprised of a substantially flexible polymeric material such as a polyimid, for example, Kapton™. In one embodiment of the invention, the substrate is joined to top and bottom layers by means of a thermally resistant, substantially flexible silicone encapsulant on one side and with a high temperature adhesive on the other side. In a preferred embodiment, the silicone encapsulant can comprise Stycast™ 4952 (manufactured by Emerson & Cuming Specialty Polymers). The high temperature adhesive can comprise, for example, 3M.RTM.-9460PC, having a temperature rating in the range of 500° F.

Physically isolating the tag electronic components with thermally resistant materials provides a tag which exhibits superior thermal and shock resistance. The tag 11 is also substantially flexible and can be provided in thickness ranges of about 0.020 in. to 0.040 inches. Such tags should be capable of withstanding temperature ranges of approximately −40° C. to 300° C. The RFID tags can also be cycled to and from the survival temperature and the operating temperature range without adversely affecting the performance characteristics of the tags. The tags may thus be employed in the type of manufacturing environment in which sealing gaskets of the type under consideration are produced.

Figure 4:
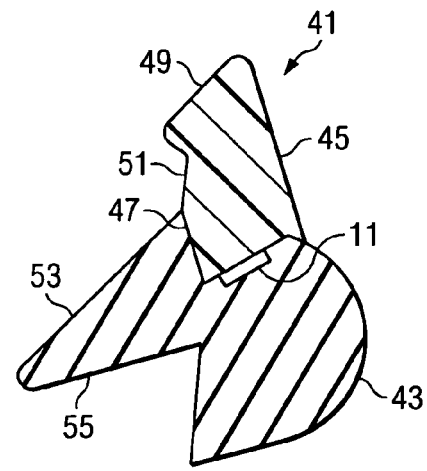
FIG. 4 is a side, cross sectional view of the gasket of FIG. 3, showing the identifying tag molded within the gasket body.

FIGS. 3 and 4 illustrate a sealing gasket 41 of the type under consideration. The gasket 41 is generally described in issued U.S. Pat. No. 4,834,398, assigned to the assignee of the present invention. The gasket in question happens to be a "dual durometer" gasket, although it will be understood that other gasket types customary in the industry may be utilized, as well. As shown in FIGS. 3 and 4, the gasket body is integrally formed as a unitary member from a first portion 43 of a resilient, moisture proof material, such as a relatively low durometer natural or synthetic rubber to provide efficient sealing against within a pipe groove. The body also includes a second portion 45 formed of a harder, less resilient material which has a higher durometer than the material of the first portion 43. Suitable materials for the second portion 45 include hard plastic materials, such as polypropylene plastic or polyvinyl chloride plastic or relatively higher durometer rubber. In the preferred embodiment the second portion 45 is formed from rubber having a Shore A durometer on the order of 75 to 95 and the first portion 43 is formed from rubber having a Shore A durometer on the order of 40 to 65. By "integrally formed" body portions is intended to mean that the portions 43, 45 are bonded or otherwise joined along an angular boundary 47. The portions 43, 45 could be produced, for example, by extrusion, the portions 43, 45 being joined by gluing or vulcanization to form the unitary gasket 41.

The particular gasket shown in FIGS. 2 and 3 has an interior which includes a tapered entry surface 49 which joins an integrally formed band region 51. The band region 51 circumscribes the central longitudinal axis of the pipe joint and has a constant internal diameter with respect to the central longitudinal axis of the pipe joint during pipe joint assembly. The interior of the gasket body also has an inwardly extending projection 53 which includes an annular conical sealing surface which provides an elongated deformation length and serves as a sealing area with respect to the inner pipe during assembly. The inwardly extending projection 53 has a rear face 55 which forms and acute angle with respect to the remainder of the first portion 43.

Since two gasket sections 43, 45 are being joined in the manufacture of the unitary gasket body, the tag 11 of the invention can easily be located along the angular boundary 47 and either glued or molded within the gasket body. In this way, the tag would not be subject to the forces normally encountered in "belling" a pipe end in a Rieber type manufacturing process or during the pipe joint assembly in the field.

Where the identifying tag is merely being used in the warehouse for inventory control type purposes, it can also be a fixed in any convenient manner to the gasket body, such as by the hang tag indicated as 11' in FIG. 3, or by merely a fixing the tag 11" with a suitable glue or adhesive to the gasket exterior surface.

An invention has been provided with several advantages. The RFID tags used in the system of the invention provide improved readability and reliability over line of sight identification systems such as those utilizing bar codes or optic readers. The tags are readable despite various orientations of the sealing gasket being handled. The tags can withstand both chemical attack, shock and temperature cycles likely to be encountered in the intended environment of use. The tags are reasonably priced, allowing them to be economically incorporated into, for example, a sealing gasket used in municipal water line applications.

While the invention has been shown in only one of its forms, it is not thus limited but is susceptible to various changes and modifications without departing from the spirit thereof.

I claim:

1. A method of marking and identifying a gasket, the method comprising the steps of:
   providing a radio frequency identification device (RFID) of a suitable size and configuration for a particular task at hand;
   attaching at least one such RFID to the gasket to be marked and identified; and
   subsequently interrogating the RFID by means of a suitable reader to thereby obtain identifying information about the gasket.

2. The method of claim 1, wherein the RFID is a tag which is read by an associated reader.

3. The method of claim 2, wherein the tag contains information which is alterable by the reader.

4. The method of claim 1, wherein the RFID is encapsulated in an encapsulating material which renders it impervious to normal environmental influences.

5. The method of claim 4, wherein the RFID is encapsulated in a liquid resin which is subsequently cured.

6. The method of claim 5, wherein the RFID is encapsulated in an epoxy resin.

7. The method of claim 1, wherein the RFID contains sensitive electrical components and wherein the sensitive electrical components are physically isolated from the environment by enclosing the components in a top and bottom layer of heat resistant polymeric materials.

8. A method of marking and identifying a sealing gasket, the method comprising the steps of:
- fabricating a wireless radio frequency identification device comprising:
- providing a substrate having conductive lines formed thereon, the conductive lines comprising an antenna;
- conductively bonding an integrated circuit chip and a battery to the conductive lines on the substrate;
- providing a liquid resin which is compatible with the substrate, integrated circuit chip and battery and applying the liquid resin onto the substrate effective to encapsulate the chip and battery within the liquid resin on the substrate;
- after the applying, curing the liquid resin mixture into a solid mass which encapsulates the chip and battery and comprises a wireless radio frequency identification device; and
- attaching the wireless radio frequency device to the sealing gasket.

9. The method of claim 8, wherein the liquid resin is a liquid epoxy mixture which is substantially void of any liquid material other than a hardener and the resin.

10. A method of marking and identifying a pipe sealing gasket which is formed with an elastomeric body, the method comprising the steps of:
- providing a radio frequency device (RFID) of a suitable size and configuration to be incorporated within the gasket body;
- installing the at least one such RFID within the gasket body so that the RFID is integrally contained within the body without being exposed to a surrounding work environment; and
- subsequently interrogating the RFID by means of a suitable reader to thereby obtain identifying information about the gasket.

11. The method of claim 10, wherein the gasket is a dual durometer gasket having a first portion of a relatively low durometer rubber which is joined along an angular boundary to a second portion of greater relative durometer; and
- wherein the RFID is installed within the body of the gasket at a point located along the angular boundary and the gasket portions are subsequently joined to form an integral body.

* * * * *